United States Patent
Kairawicz et al.

(10) Patent No.: US 6,841,194 B1
(45) Date of Patent: Jan. 11, 2005

(54) PROCESS FOR APPLYING GRAPHITE COATINGS TO NON-CYLINDRICAL BATTERY CANS

(75) Inventors: Raymond G. Kairawicz, Watertown, CT (US); Klaus Pflugbeil, Toronto (CA)

(73) Assignee: Truelove & Maclean, Incorporated, Waterbury, CT (US)

( * ) Notice: Subject to any disclaimer, the term of this patent is extended or adjusted under 35 U.S.C. 154(b) by 0 days.

(21) Appl. No.: 10/732,676

(22) Filed: Dec. 10, 2003

(51) Int. Cl.[7] .................................................. B05D 7/22
(52) U.S. Cl. ...................... 427/235; 427/105; 427/122; 427/181; 427/236; 427/345; 427/372.2
(58) Field of Search ................................ 427/105, 122, 427/230, 235, 236, 238, 294, 345, 372.2, 421, 181; 429/122, 163, 164, 176

(56) References Cited

U.S. PATENT DOCUMENTS 4,048,394 A * 9/1977 Ludwig ...................... 429/104
4,051,876 A * 10/1977 Foulkes ...................... 141/1.1
5,698,260 A * 12/1997 Roth et al. .................. 427/235
5,958,620 A * 9/1999 Nagaura ..................... 429/164

* cited by examiner

*Primary Examiner*—Shrive P. Beck
*Assistant Examiner*—William Phillip Fletcher, III
(74) *Attorney, Agent, or Firm*—McCormick, Paulding & Huber LLP

(57) ABSTRACT

A process for applying a graphite coating to the interior of a prismatic battery can by filling the can with a slurry containing graphite particles, immediately removing the slurry with an aspirating nozzle and then drying the residue left in the battery can to leave a thin film of graphite on the interior of the can. In a continuous process, fill nozzles and aspirating nozzles are moved in set into and out of the cans simultaneously, while moving the nozzles along with the cans through a fill and aspirate station on a conveyor. From there the cans travel through a drying oven where the residue remaining in the cans is dried to leave a thin uniform graphite film inside a prismatic can.

6 Claims, 3 Drawing Sheets

PROCESS FOR APPLYING GRAPHITE COATINGS TO NON-CYLINDRICAL BATTERY CANS

TECHNICAL FIELD

This invention relates generally to non-cylindrical or prismatic battery cans and methods of applying graphite coatings to the interiors of such cans. More particularly, the invention relates to a method for continuously applying graphite coatings to non-cylindrical or prismatic battery cans carried by a conveyor in a continuous production line.

BACKGROUND OF THE INVENTION

Disposable battery cells are utilized in a wide variety of applications to provide either a main source of power or back-up power to a wide variety of devices. These cells are typically acidic or alkaline electrolytic pastes contained in battery cans. The cans are fabricated from thin metal sheeting and then zinc and carbon or zinc and manganese oxide electrodes. The cans are typically manufactured as cylindrical shapes in standard sizes such as A, AA, AAA, C, D, etc. for well-known applications such as toys, flashlights, portable radios and the like. However, another cell shape known in the art as "prismatic" is enjoying increased usage for specialty applications, wherein the cell shape is non-cylindrical.

As an intermediate step in the manufacturing process of disposable battery cells, a graphite coating is applied to the interior of the battery can to form a uniform film on the interior of the base and sidewall up to a pre-selected height on the interior sidewall. Because the can is cylindrical, it has been the practice in the prior art of high volume manufacture of cylindrical battery cells to spin the empty battery cans lying horizontally on their sides at high speed while a graphite dispersion is applied via a spray gun and a nozzle inserted into the interior of the can. Non-cylindrical battery cans do not lend themselves to this method of applying graphite coatings, because they cannot be rotated around an axis at high speed as in the case of cylindrical battery cans.

While it would be possible to construct a special spray nozzle to conform to the interior of a prismatic battery can, this would require different sizes and shapes of spray nozzles. The application of a graphite coating in this manner would not be suitable for high speed, high volume production of battery cans.

Accordingly, one object of the present invention is to provide an improved process for applying a graphite coating to the interior of a non-cylindrical battery can.

Another object of the invention is to provide an improved process for applying graphite coatings to the interiors of a group of non-cylindrical battery cans moving continuously on a conveyor in a production line.

SUMMARY OF THE INVENTION

Briefly stated, the invention comprises a process for applying a graphite coating to the interior of a non-cylindrical battery can, comprising the steps of (1) providing a battery can having an open top, a base and a side wall with a non-circular cross section, (2) introducing a slurry containing graphite particles into the open top of the battery can to a pre-selected level, (3) aspirating the slurry from the battery can to leave a residue on the base and sidewall, and (4) drying the residue to leave a film of graphite on the base and sidewall. As part of a preferred process for applying coatings to a number of non-cylindrical battery cans moving in a production line, the preferred process comprises (1) providing a conveyor with holders for battery cans, (2) loading the battery cans into the holders, (3) providing a group of fill nozzles and a group of aspirating nozzles arranged to move along with the battery cans, (4) inserting the fill nozzles into the tops of the battery cans as they move and introducing a slurry containing graphite particles, (5) withdrawing the fill nozzles, (6) inserting the aspirating nozzles into the open tops of the group of battery cans and aspirating the slurry to leave a residue on the base and sidewall, (7) withdrawing the aspirating nozzles, (8) providing a drying oven, and (9) moving the group of battery cans through the drying oven to leave a film of graphite on the base and sidewall.

DETAILED DESCRIPTION

Figure 1:
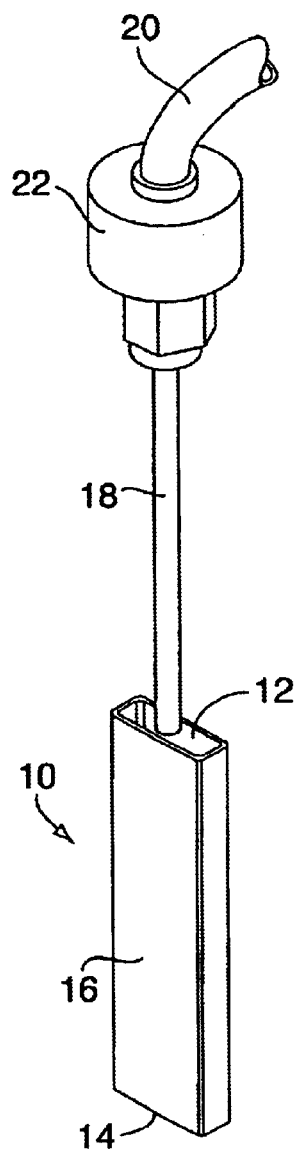
FIG. 1 is a perspective view of an empty battery can under a fill nozzle.

Referring to FIG. 1 of the drawing, a perspective view is shown of a "prismatic" battery can 10 that is substantially in the shape of a rectangular prism. The battery can 10 is shown as having a rectangular cross section that can vary considerably in actual width and depth of the rectangle as well as the length of the battery can, in order to suit the specialty application using the energy cell. Battery can 10 may have a polyhedron cross section, oval cross section or an irregular non-cylindrical cross section of any shape, depending upon the application. The non-cylindrical battery can 10 includes an open top 12, a base 14 and a sidewall 16 with a non-circular cross section. Battery can 10 is fabricated from thin metal sheeting, and is usually drawn in progressive dies by a process well-known in the art.

A fill nozzle 18 is shown with its open end disposed above the open top 12 of the battery can, which is disposed in an upright position. Fill nozzle 18 is supplied through a flexible hose 20 via a moveable supply header 22.

Figure 2:
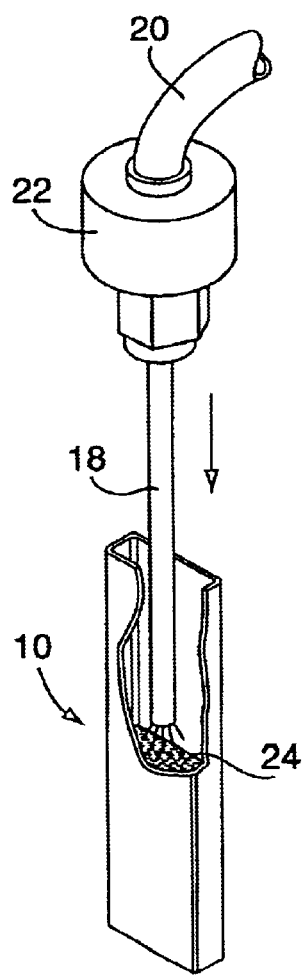
FIG. 2 is a similar perspective view showing the nozzle filling the can with a graphite slurry.

Referring to FIG. 2 of the drawing, fill nozzle 18 is shown lowered into the interior of battery can 10 by means of the supply header 22 through a mechanical connection (not shown). A source of a slurry containing graphite particles is connected under pressure from a pump to hose 20. The slurry indicated by reference number 24 flows from fill nozzle 18 to fill the interior of battery can 10 to a pre-selected level.

Figure 3:
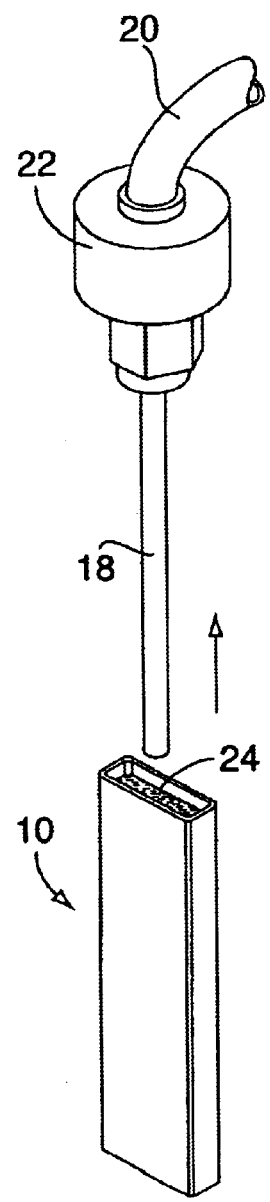
FIG. 3 is a perspective view of the fill nozzle being withdrawn from the slurry-filled battery can.

Referring to FIG. 3 of the drawing, fill nozzle 18 is shown withdrawn from the open top 12 of the battery can. Flexible hose 20 has been disconnected from the source of pressurized graphite-containing slurry by closing a valve. The slurry 24 has filled the interior of battery can 10 to a pre-selected level.

Figure 4:
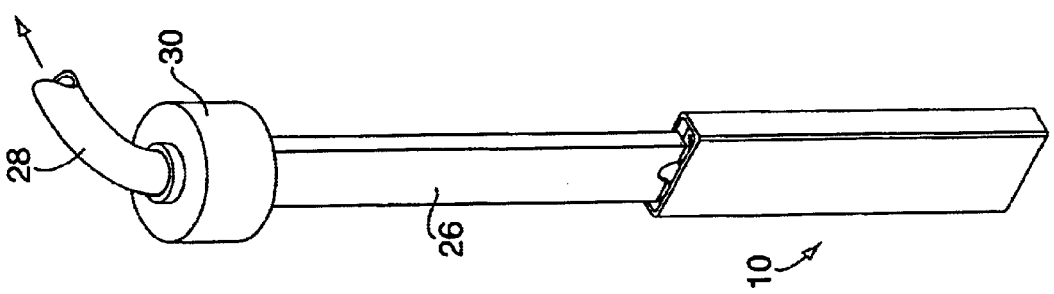
FIG. 4 is a similar perspective view showing the slurry-filled battery can beneath an aspirator nozzle.

Referring to FIG. 4 of the drawing, an aspirator nozzle 26 is shown disposed with its open end disposed above the open top of battery can 10. Aspirator nozzle 26 is connected to a flexible hose 28 via a suction header 30. A source of reduced pressure such as a vacuum pump is connected to flexible hose 28 so that the slurry is aspirated into aspirator nozzle 26.

Figure 5:
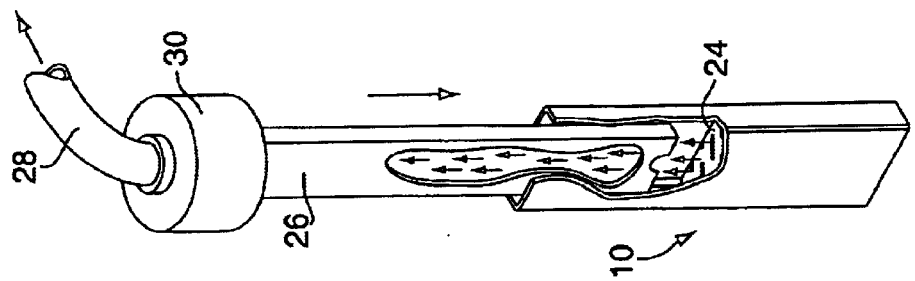
FIG. 5 is a similar view showing the aspirator moving downward to remove the slurry.

Reference to FIG. 5 of the drawing illustrates the aspirator nozzle 26 being lowered into the interior of battery can 10 by means of suction header 30 through a mechanical connection (not shown). The slurry is aspirated into the aspirator nozzle and withdrawn through hose 28. The slurry commences to be aspirated and the level of the slurry is lowered in the can as soon as the aspirator nozzle is in proximity with the top of the open can and is connected to a vacuum source. This enables a precise pre-selection of the upper extent of the graphite coating in the battery can.

Figure 7:
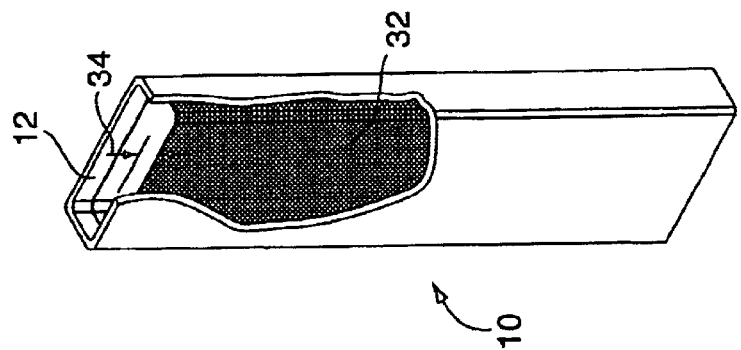
FIG. 7 is a similar perspective view with one sidewall section removed to illustrate a graphite film on the interior of the battery can.
Figure 6:
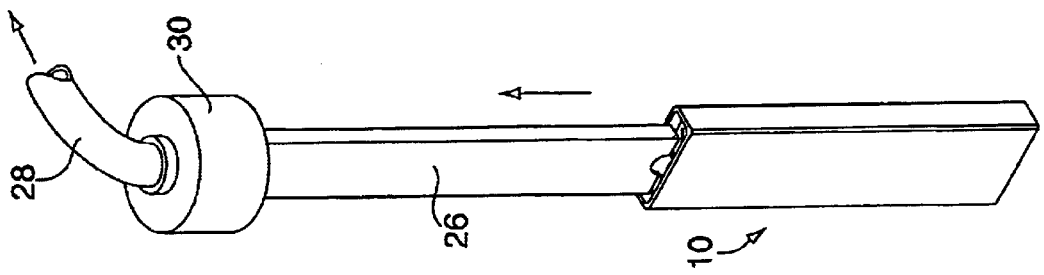
FIG. 6 is a similar view showing the aspirator being withdrawn from the battery can.

Reference to FIG. 6 of the drawing illustrates the aspirator nozzle 26 withdrawn from the battery can 10. The next step of the process comprises drying the residue of the slurry left on the interior walls and base of the battery can. Drying the residue leaves a thin film of graphite indicated by reference number 32 in FIG. 7. The graphite layer extends to a pre-selected level 34 below the open top 12 of the battery can.

The preferred slurry contains a dispersion of finely divided graphite particles in an aqueous carrier, termed a slurry because graphite particles are insoluble in the carrier. A suitable slurry comprises specially formulated Timcal LB 1019 graphite dispersion manufactured by Timcal. Other graphite-containing slurries such as those manufactured by Acheson, Nippon, or Superior may also be suitable. After drying, a thin uniform graphite film uniformly coats the interior walls of the battery can. The coating may accurately extend to within a few millimeters of the top edge of the battery can.

Continuous Process

Figure 9:
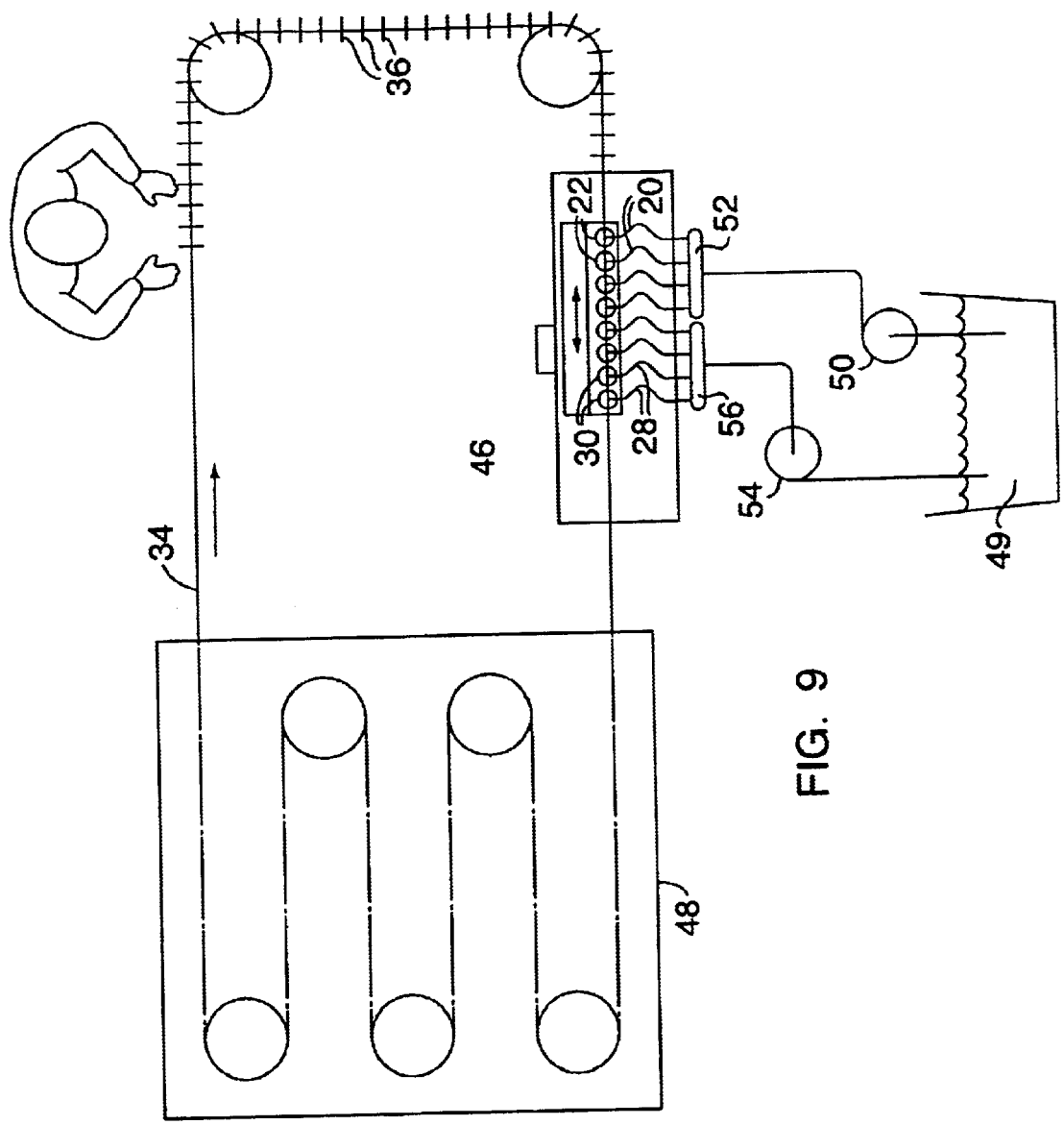
FIG. 9 is a diagrammatic plan view of a production line for continuously applying graphite coatings to prismatic battery cans.
Figure 8:
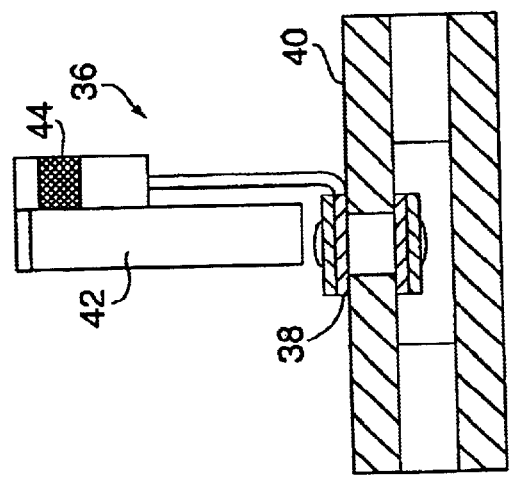
FIG. 8 is an elevation view of a section of a conveyor with a single battery can holder.

While the drawings of FIGS. 1–7 illustrate the basic process of applying a graphite coating to non-cylindrical battery cans, the preferred process for continuous production of such cans is best illustrated by reference to FIGS. 8 and 9 of the drawings. As shown in FIG. 9, a continuous moving conveyor 34 is either manually or automatically loaded with non-cylindrical (prismatic) battery cans 10 as previously described by inserting them into holders 36 in an upright position with the open end upward. Reference to FIG. 8 of the drawing illustrates a typical holder 36 connected to a single link 38 of a chain link conveyor. Holder 36 and link 38, together with contiguous connected links and holders (not shown) travel along a chain guide 40. Holder 36 includes a receptacle 42 and a holding magnet 44 that hold the can in an upright position. Conveyor 34 travels continuously through a "fill and aspirate" station 46 and a drying oven 48. A set of fill nozzles (not shown) are connected to respective fill headers 22 by flexible hoses 20. Similarly, a set of aspirating nozzles (not shown) are connected to their respective suction headers 30 which, in turn, are connected to flexible hoses 28 as previously described. Headers 22, 30 are mechanically connected and ganged to move as a single unit both vertically and horizontally to coincide with the travel of the battery can holders 36.

A source of slurry containing graphite particles is indicated schematically at 49. Slurry is pumped by pump 50 to a supply header 52 to supply the fill hoses 20. Similarly, a suction pump 54 is connected to a suction header 56. Flexible suction hoses 28 are connected to suction header 56, and the pump 50 is connected to return aspirated slurry to source 49.

The fill and aspirate station 46 is programmed to coordinate the up and down movement and the horizontal back and forth movement of the ganged supply headers 22 and suction headers 30 in the following manner. The headers commence horizontal movement along with the conveyor, so that the fill nozzles and aspirating nozzles are positioned above the open tops of the battery cans. Fill nozzles 22 are lowered into a group of empty battery cans while aspirating nozzles are lowered into an adjacent, previously filled adjacent group of battery cans, so that simultaneous filling of the cans and aspiration of slurry from the previously filled cans takes place simultaneously as the battery cans pass through the fill and aspirate station 46. Next the headers 22 and 30 move up vertically to withdraw the respective fill and suction nozzles, whereupon the ganged headers move horizontally to return to the start position, so that the cycle may repeat.

The drying oven 48 receives the battery cans in a conveyor pattern of sufficient length to dry the residue, leaving a thin film of graphite on the interior of the battery cans. Upon emerging from the drying oven 48, the battery cans may either be automatically ejected or manually unloaded and inspected.

While there has been described what is considered to be the preferred embodiment of the invention, other modifications will occur to those skilled in the art, and it is desired to secure in the appended claims all such modifications as fall within the true spirit and scope of the invention.

What is claimed is:

1. Process for applying a graphite coating to the interior of a non-cylindrical battery can, comprising the steps of
providing a battery can having an open top, a base and a sidewall with a non-circular cross-section,
introducing a slurry containing graphite particles into the open top of said battery can to a pre-selected level,
aspirating said slurry from the battery can to leave a residue on the base and sidewall, and
drying said residue to leave a film of graphite on said base and sidewall.

2. The process according to claim 1, wherein said slurry is introduced by providing a fill nozzle and inserting it into the battery can, and wherein the slurry is aspirated by providing an aspirating nozzle and inserting it into the battery can.

3. The process according to claim 2, including the step of re-circulating said aspirated slurry to said fill nozzle.

4. Process for applying graphite coatings to the interiors of a plurality of non-cylindrical battery cans in a production line, comprising the steps of:
providing a plurality of battery cans each having an open top, a base and a sidewall with a non-circular cross-section,
providing a conveyor having a plurality of holders for said battery cans,
loading said battery cans into said holders in an upright position with the open tops directed upwardly,
providing a plurality of fill nozzles and a plurality of aspirating nozzles,
inserting said plurality of fill nozzles into the open tops of a selected group of said battery cans and introducing a slurry containing graphite particles to a pre-selected level, withdrawing said fill nozzles, inserting said plurality of aspirating nozzles into the open tops of said selected group of battery cans and aspirating said slurry to leave a residue on the base and sidewall, withdrawing said suction nozzles, providing a drying oven, and moving said selected group of battery cans through said drying oven to leave a film of graphite on said base and said sidewall.

5. The process according to claim 4, wherein said conveyor is continuously moving, wherein said plurality of fill nozzles and said plurality of aspirating nozzles are adapted to move from a starting position along with said battery cans in said holders, and arranged to be inserted simultaneously and withdrawn simultaneously from said open tops of the battery cans, and to return to said starting position.

6. The process according to claim 5, wherein said aspirated slurry is re-circulated to said fill nozzles.

* * * * *